United States Patent
Powell (10) Patent No.: US 9,786,085 B2
(45) Date of Patent: Oct. 10, 2017

(54) METHOD AND SYSTEM FOR DIRECTLY MANIPULATING THE CONSTRAINED MODEL OF A COMPUTER-GENERATED CHARACTER

(71) Applicant: DreamWorks Animation LLC, Glendale, CA (US)

(72) Inventor: Alexander P. Powell, Los Angeles, CA (US)

(73) Assignee: DreamWorks Animation L.L.C., Glendale, CA (US)

( * ) Notice: Subject to any disclaimer, the term of this patent is extended or adjusted under 35 U.S.C. 154(b) by 0 days.

(21) Appl. No.: 13/844,005

(22) Filed: Mar. 15, 2013

(65) Prior Publication Data

US 2014/0267312 A1    Sep. 18, 2014

(51) Int. Cl.
*G06T 13/80* (2011.01)
*G06T 13/40* (2011.01)

(52) U.S. Cl.
CPC .............. *G06T 13/80* (2013.01); *G06T 13/40* (2013.01)

(58) Field of Classification Search
CPC .......... G06T 13/20; G06T 13/80; G06T 13/40
USPC ......................................................... 345/474
See application file for complete search history.

(56) References Cited

U.S. PATENT DOCUMENTS

| 5,594,856 | A |  | 1/1997 | Girard |  |
|---|---|---|---|---|---|
| 5,990,908 | A |  | 11/1999 | Thingvold |  |
| 6,057,859 | A | * | 5/2000 | Handelman | G06T 13/40 345/473 |
| 6,088,042 | A |  | 7/2000 | Handelman et al. |  |
| 6,191,798 | B1 |  | 2/2001 | Handelman et al. |  |
| 6,310,619 | B1 | * | 10/2001 | Rice | 345/420 |
| 6,317,125 | B1 | * | 11/2001 | Persson | 345/423 |
| 7,012,608 | B1 |  | 3/2006 | Fujisaki |  |
| 7,545,378 | B2 | * | 6/2009 | Russ et al. | 345/473 |
| 7,872,653 | B2 |  | 1/2011 | Zhou et al. |  |

(Continued)

OTHER PUBLICATIONS

Ken Tsutsuguchi et al. Human walking animation based on foot reaction force in the three-dimensional virtual world, J. Visual. Comput. Animat. 2000; 11: 3-16.*

(Continued)

*Primary Examiner* — Devona Faulk
*Assistant Examiner* — Hai Tao Sun
(74) *Attorney, Agent, or Firm* — Dentons US LLP (57) ABSTRACT

A rail manipulator indicates the possible range(s) of movement of a part of a computer-generated character in a computer animation system. The rail manipulator obtains a model of the computer-generated character. The model may be a skeleton structure of bones connected at joints. The interconnected bones may constrain the movements of one another. When an artist selects one of the bones for movement, the rail manipulator determines the range of movement of the selected bone. The determination may be based on the position and/or the ranges of movements of other bones in the skeleton structure. The range of movement is displayed on-screen to the artist, together with the computer-generated character. In this way, the rail manipulator directly communicates to the artist the degree to which a portion of the computer-generated character can be moved, in response to the artist's selection of the portion of the computer-generated character.

18 Claims, 9 Drawing Sheets

(56) References Cited

U.S. PATENT DOCUMENTS 8,289,331 B1* 10/2012 Trezevant ............... G06T 13/20
345/473
2006/0250402 A1 11/2006 Perlin
2009/0295809 A1 12/2009 Girard
2010/0214313 A1* 8/2010 Herman et al. ............... 345/593

OTHER PUBLICATIONS

3DPERSPECTIVES, "SIMULIA Animated Foot", Solving Engineering Challenges Across all Industries, Mar. 23, 2009, available online at <http://www.youtube.com/watch?v=aAoyaXx4SWs>, 1 page.
The Flux Machine, "Heel Toe Salsa Test", Jun. 20, 2010, available online at <http://www.youtube.com/watch?v=PrnPr09Li9Q>, 1 page.
The Virtual Reality Lab, "VR Lab Movies", Available online at <http://archiveweb.epfl.ch/vrlab.epfl.ch/Movies/Movies_index.html>, retrieved on Nov. 28, 2013, 1 page.
Tsutsuguchi et al., "Human Walking Animation Based on Foot Reaction Force in the Three-Dimensional Virtual World", The Journal of Visualization and Computer Animation, vol. 11, 2000, pp. 3-16.
Extended European Search Report received for European Patent Application No. 14159782.3, mailed on Jul. 28, 2014, 8 pages.
Anonymous, "Blender 2.4 Manual: Inverse Kinematics", BlenderWiki, retreived on Jul. 10, 2014, available at <http://wiki.blender.org/index.php/Doc:2.4/Manual/Rigging/Posing/inverse_Kinematics>, Jun. 2009, pp. 1-22.
Vahrenkamp et al., "Efficient Inverse Kinematics Computation based on Reachability Analysis", International Journal of Humanoid Robotics, vol. 9, No. 4, 2012, pp. 1-26.

* cited by examiner

METHOD AND SYSTEM FOR DIRECTLY MANIPULATING THE CONSTRAINED MODEL OF A COMPUTER-GENERATED CHARACTER

BACKGROUND

1. Field

The present disclosure relates generally to computer graphics, and more specifically to tools for manipulating a computer-generated character in computer animation.

2. Description of Related Art

In computer animation, a computer-generated character can be modeled using what is called a character rig. Generally, a character rig defines the various portions of a computer-generated character and their corresponding characteristics. For instance, some parts of a computer-generated character may be flexible, while other parts may be rigid. In addition, the different portions may be allowed to move freely or in limited fashion with respect to each other. A computer-generated skin layer covers the character rig, and provides the computer-generated character with a desired outward visual appearance, which may include, for example, clothing, skin, hair, and so forth. Movements of the character rig between subsequent animation frames produce corresponding deformation of the skin layer; when the frames are viewed in rapid succession, they give viewers the perception of animation.

A character rig may resemble a skeleton structure. The bones of such a skeleton structure can be placed, by an artist, in different poses. The use of a skeleton structure to model a computer-generated character can promote realism in the movements of certain computer-generated characters, particularly those that mimic real-life creatures, which also have underlying skeletal structures that constrain their own movements. For example, a computer-generated humanoid character that is defined using a human-like skeleton structure can be more easily manipulated to move like a human being.

BRIEF SUMMARY

In some embodiments, a rail manipulator indicates the possible range(s) of movement of a part of a computer-generated character in a computer animation system. The rail manipulator obtains a model of the computer-generated character. The model may be a skeleton structure of bones connected at joints. The interconnected bones may constrain the movements of one another. When an artist selects one of the bones for movement, the rail manipulator determines the range of movement of the selected bone. The determination may be based on the position and/or the ranges of movements of other bones in the skeleton structure. The range of movement is displayed on-screen to the artist, together with the computer-generated character. In this way, the rail manipulator directly communicates to the artist the degree to which a portion of the computer-generated character can be moved, in response to the artist's selection of the portion of the computer-generated character.

DETAILED DESCRIPTION

The following description sets forth exemplary methods, parameters, and the like. It should be recognized, however, that such description is not intended as a limitation on the scope of the present disclosure, but is instead provided as a description of exemplary embodiments.

The use of character rigs to model computer-generated characters increases the complexity of supporting computer animation systems. Computer animation viewers naturally expect the connected body parts of a computer-generated character to move consistently with respect to one another. To achieve this effect, when a computer animation system determines the movements of a portion of a computer-generated character, the computer animation system must also consider the impact that other portions of the computer-generated character have on the specific movement that is being modeled. Movements in one portion of a character rig may be constrained by other portions of the character rig.

Figure 1A:
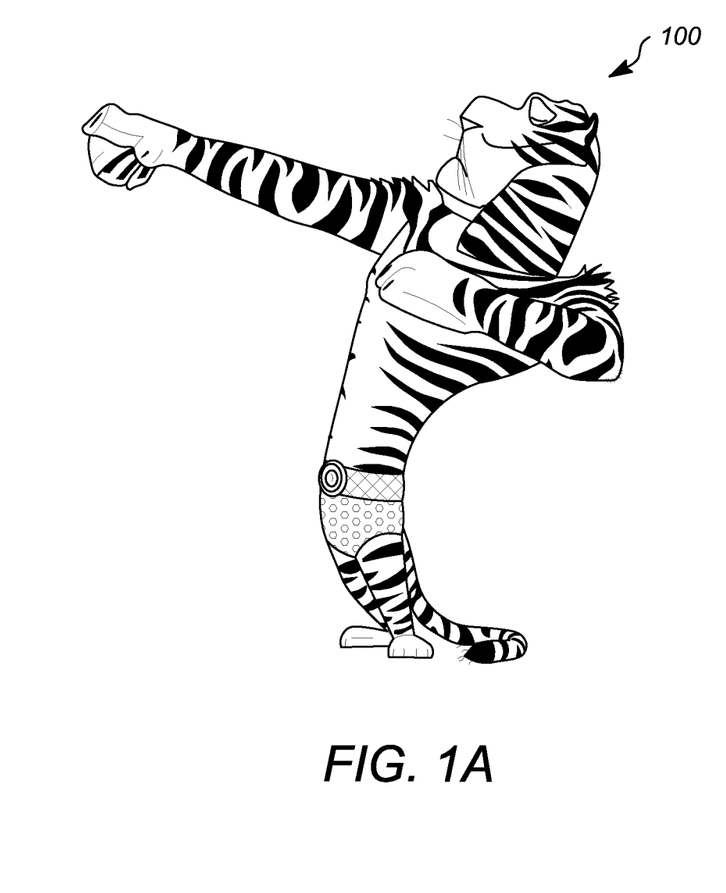
FIG. 1A is a screenshot depicting an exemplary computer-generated character.
Figure 1B:
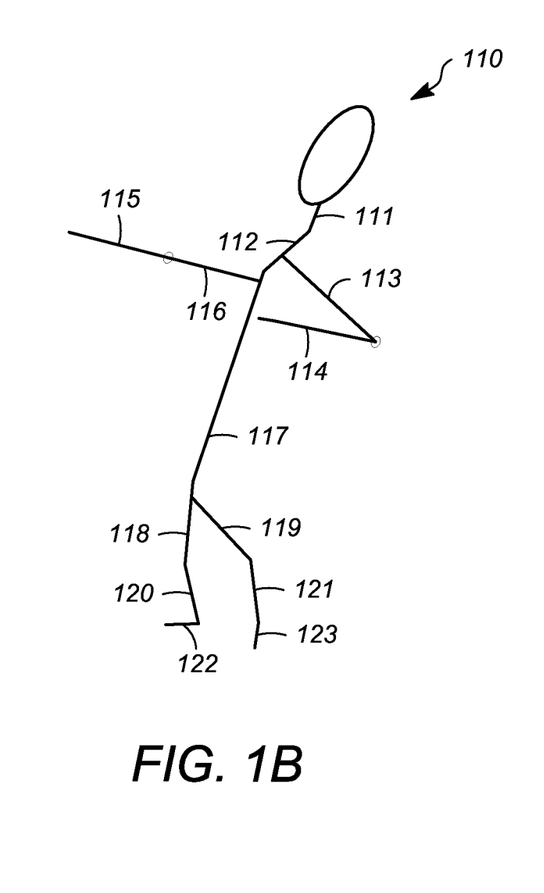
FIG. 1B is a screenshot depicting an exemplary skeleton structure of a computer-generated character.

FIGS. 1A-1B depicts an exemplary computer-generated character, tiger 100, and a character rig, skeleton structure 110, that is used to model tiger 100. Tiger 100 is a fictional humanoid character. Skeleton structure 110 consists of bones 111-123 connected at a number of joints. A bone in skeleton structure 110 may rotate, or move, about a joint. Thus, skeleton structure 110 may move from pose 111 to other poses.

A computer animation system may provide a rail manipulator tool ("Rail Manipulator") to aid an artist in moving parts of skeleton structure 110 to create different poses of tiger 100. The Rail Manipulator shows the artist a range of motion that is possible for a given portion of the skeleton structure that the artist is interested in, based on the constraints that are set by the skeleton structure (or, more generally, the character rig). The range of motion is computed on-the-fly and displayed to the artist in response to the artist's selection of a portion of the skeleton structure.

Exemplary embodiments of the Rail Manipulator are described below with reference to FIGS. 2-6. For the sake of simplicity, the Rail Manipulator is described in FIGS. 2-6 with reference to tiger 100 and skeleton structure 110 (FIGS. 1A-1B). It should be noted, however, that the Rail Manipulator can be used to animate other computer-generated characters and/or other types of character rigs, such as free-form character rigs. Free-form character rigs, like skeleton structures, also define a set of constraints that limit the possible movements of a computer-generated character, without relying on the concept of bones and joints.

Figure 2:
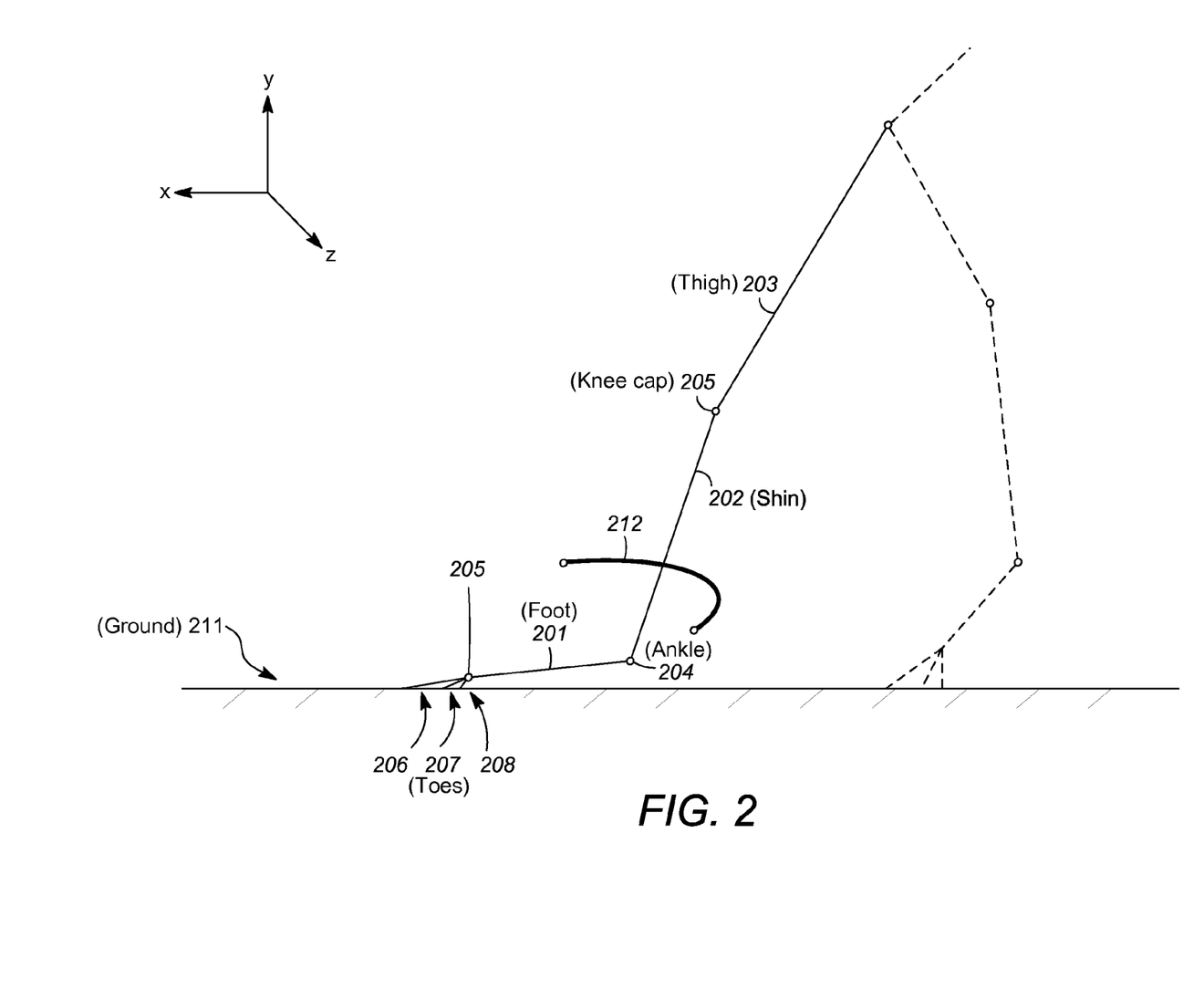
FIG. 2 is a screenshot depicting an exemplary skeleton structure of a computer-generated character.

FIG. 2 depicts the lower extremities of the skeleton structure of tiger 100, including foot bone 201, shinbone 202, and thighbone 203. As shown, foot bone 201 and shinbone 202 are connected at ankle joint 204, while shinbone 202 and thighbone 203 are connected at knee cap joint 205. Foot bone 201 is also connected to toe bones 206, 207, and 208 at the ball of the tiger's foot. One of ordinary skill in the art would appreciate that movements of ankle joint 204, where foot bone 201 and shinbone 202 connect, are limited by the positions and/or ranges of movement of other, nearby bones, including toe bones 206-208 and thighbone 203.

Under some circumstances, the range of movement of foot bone 201 and shinbone 202 about ankle joint 204 is narrow. For example, if toe bones 206-208 are defined in the computer animation system as being in permanent contact with ground 211, and if thighbone 203 is defined as being stationary, then the range of movement of ankle joint 204 (i.e., foot bone 201 and shinbone 202) would be limited to a narrow range of movement in the x-direction and z-direction, along a plane that is parallel to ground 211. This range of movement is illustrated by curve segment 212.

Figure 3:
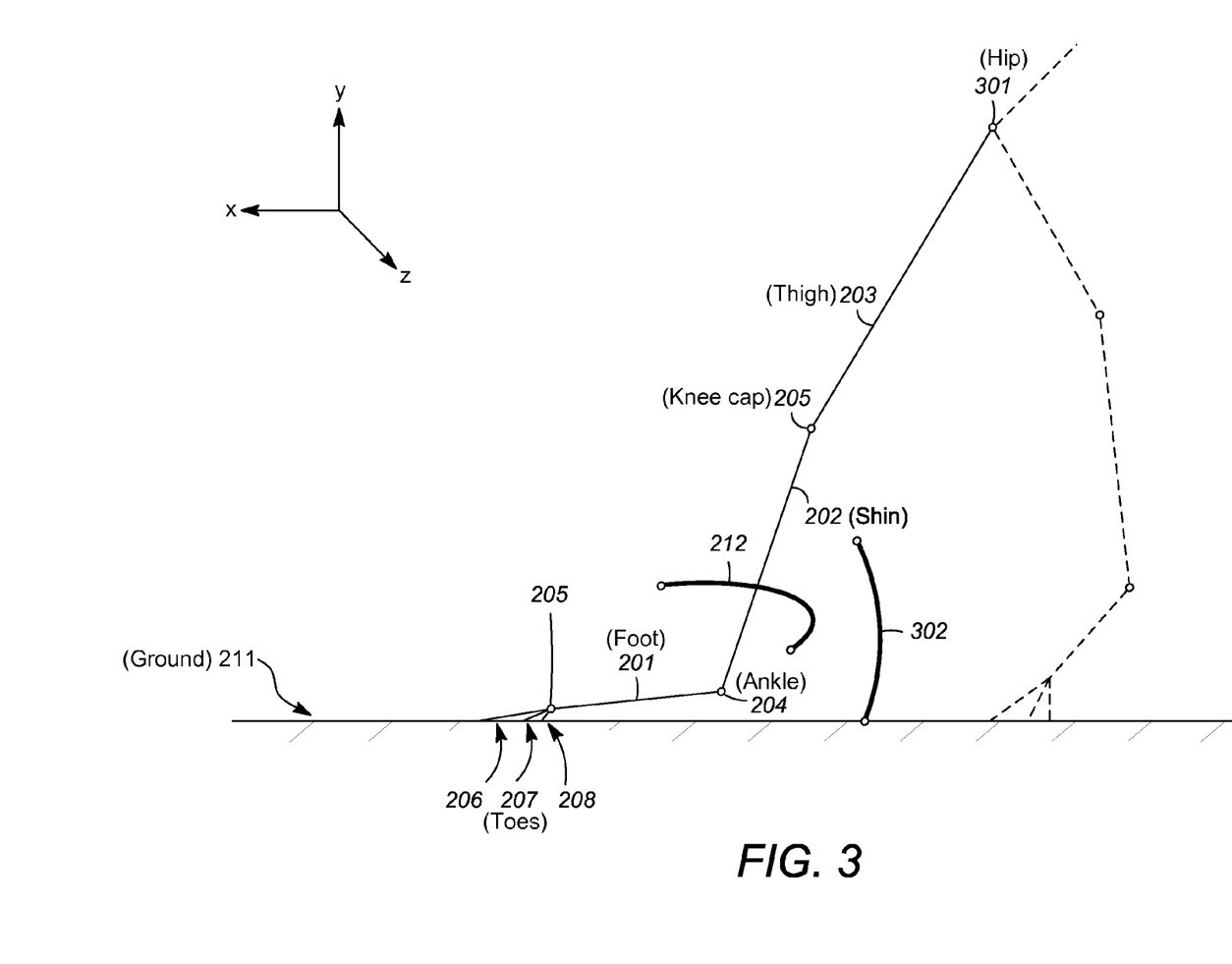
FIG. 3 is a screenshot depicting an exemplary skeleton structure of a computer-generated character.

Under other circumstances, the range of movement of foot bone 201 and shinbone 202 about ankle joint 204 is wide. Turning to FIG. 3, for example, if toe bones 206-208 are defined in the computer animation system as being in permanent contact with ground 211, but thighbone 203 is defined as being rotatable about hip joint 301, then the range of movement of ankle joint 204 (i.e., foot bone 201 and shinbone 202) would be expansive along the x-direction, y-direction, and z-direction, as illustrated by curve segments 212 and 302.

Embodiments of the Rail Manipulator display line segments and/or curve segments that represent the possible range(s) of movement of a particular portion of a computer-generated character that has been selected by a user (e.g., an artist). That is, the Rail Manipulator may display graphical representations of curve segment 212 (FIG. 2) and curve segment 302 (FIG. 3) together with a computer-generated character on a display screen of a computer animation system. Exemplary displays that may be produced using the Rail Manipulator are discussed with reference to FIGS. 4-6.

Figure 4A:
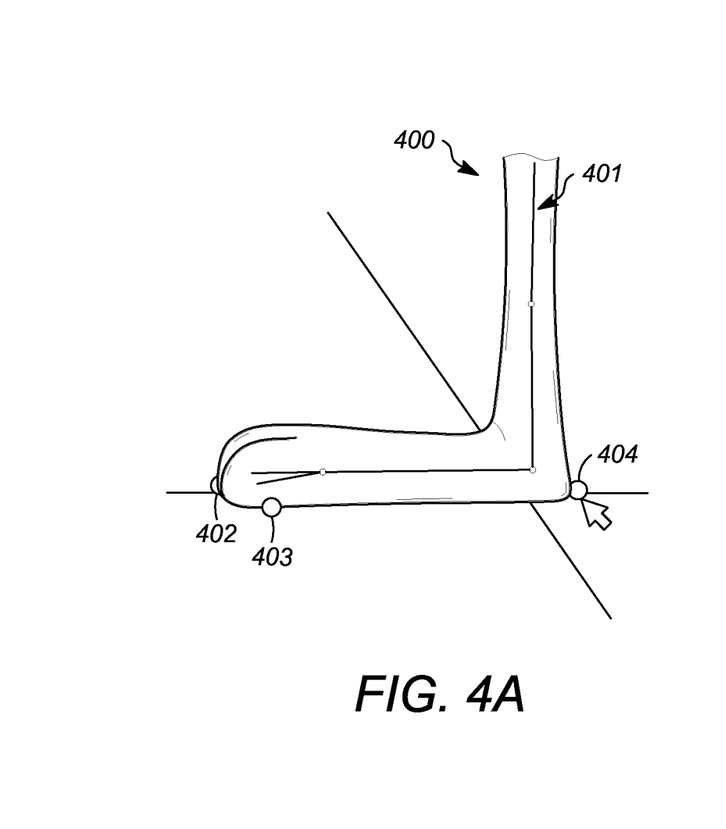
FIGS. 4A-4B are screenshots depicting an exemplary rail manipulator.
Figure 4B:
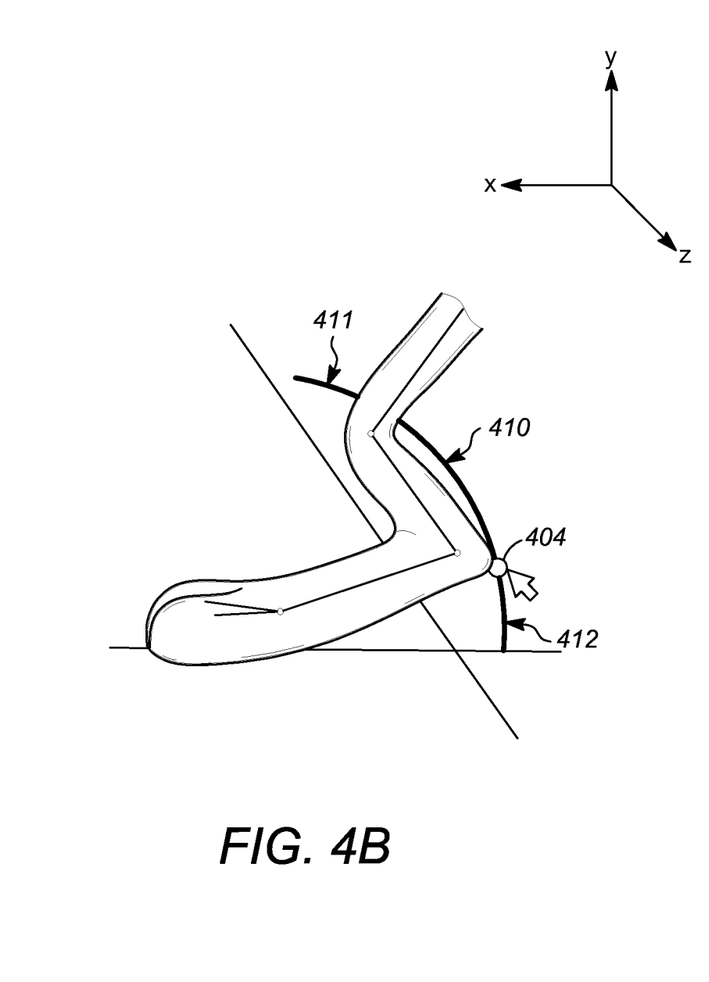

In FIG. 4A, leg 400 of tiger 100 (FIG. 1A) is shown in an initial pose. The posture of leg 400 is based on underlying skeleton structure 401. Skeleton structure 401 is covered by a computer-generated skin layer that provides the visual appearance of a leg and is not necessarily shown to a user (though it may be). The computer animation system provides nodes 402, 403, and 404 for moving leg 400 into different poses. Nodes 402-403 may correspond to control points of bones in skeleton structure 401. Turning to FIG. 4B, when a user (e.g., an artist) selects node 404, which is associated with the heel portion of leg 400, the Rail Manipulator displays curve segment 410 to indicate the possible range of movement of the heel portion along the x-axis and the y-axis. As shown, the heel portion of leg 400 can be moved within the range between endpoints 411 and 412 of curve segment 410, because the constraints of other bones of skeleton structure 401 would not permit further movement of the selected heel portion. In this way, the Rail Manipulator computes the freedom of movement of a particular part of a computer-generated character on-the-fly and communicates the possible movement to a user.

Figure 5A:
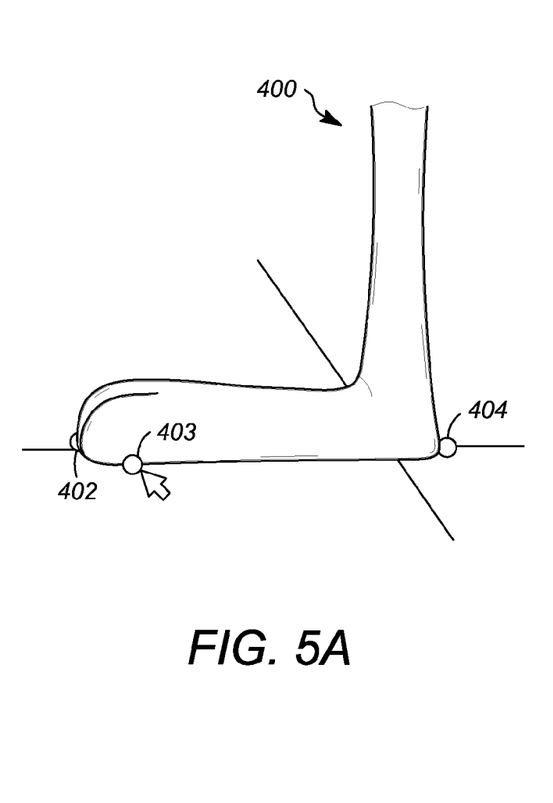
FIGS. 5A-5B are screenshots depicting an exemplary rail manipulator.
Figure 5B:
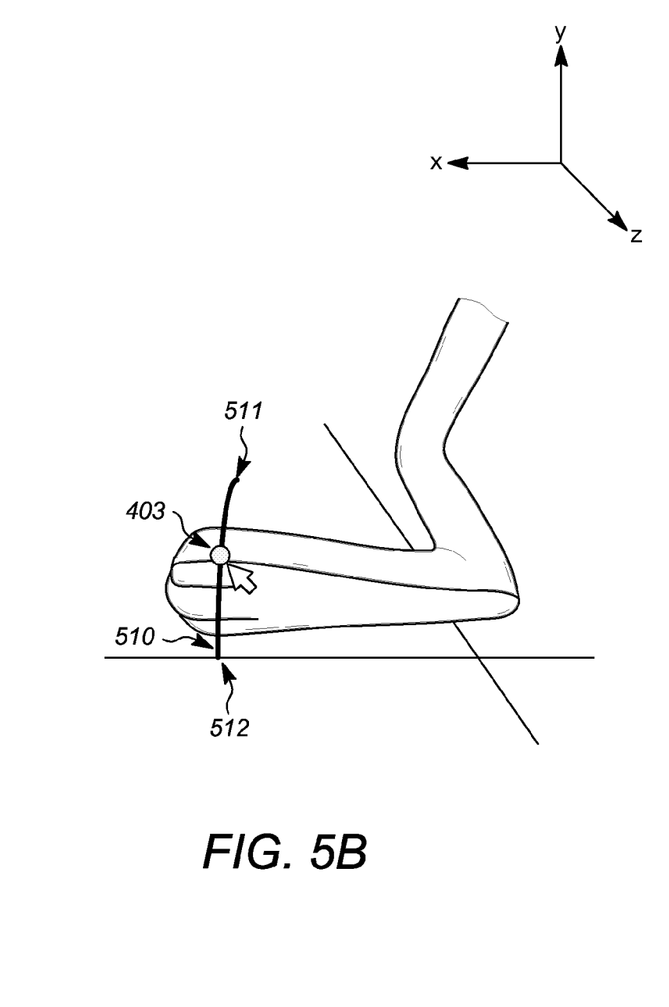

In FIG. 5A, leg 400 of tiger 100 (FIG. 1A) is again shown in the initial pose. As shown in FIG. 5B, when a user selects node 403, which is associated with the ball portion of leg 400, the Rail Manipulator displays curve segment 510 to indicate the possible range of movement of the ball portion along the y-axis and the z-axis. The ball portion of leg 400 can be moved within the range between endpoints 511 and 512 of curve segment 510, in view of the constraints of other bones in the skeleton structure of leg 400. Node 403 serves as an indicator that indicates the current position of the ball portion of leg 400 within the range of movement that is depicted by curve segment 510.

Figure 6A:
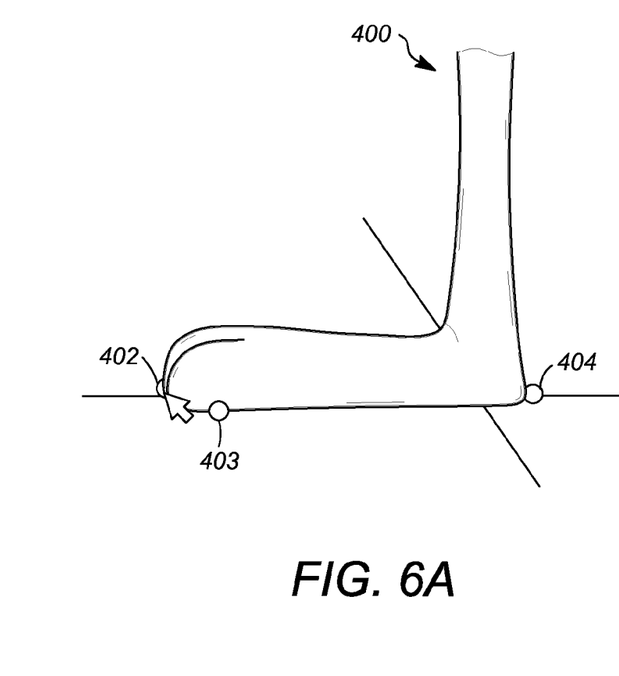
FIGS. 6A-6B are screenshots depicting an exemplary rail manipulator.
Figure 6B:
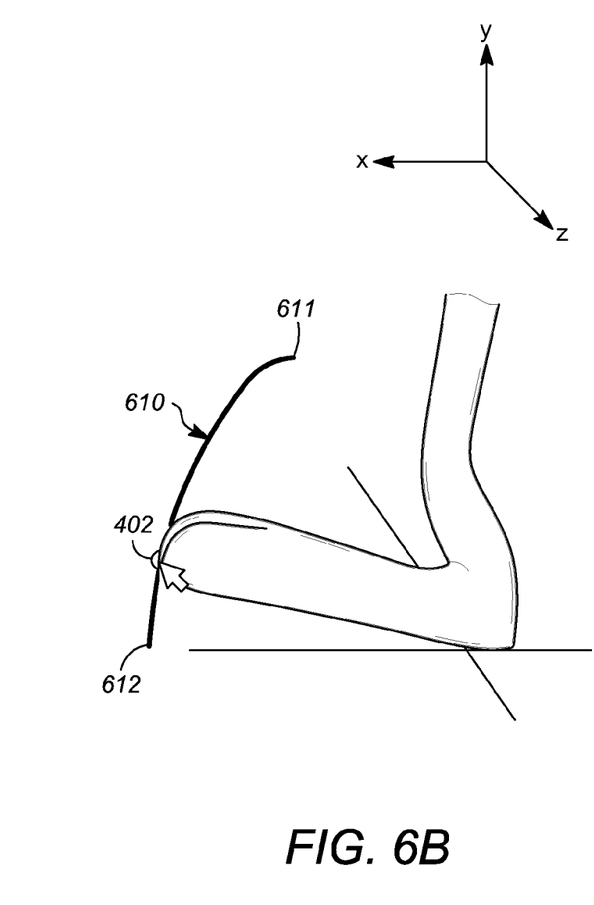

In FIG. 6A, leg 400 of tiger 100 (FIG. 1A) is again displayed in the initial pose. When a user selects node 402, which is associated with the toes of leg 400, the Rail Manipulator displays curve segment 610 to indicate the possible range of movement of the toes along the x-axis and the y-axis. As depicted in FIG. 6B, the toes of leg 400 can only be moved within the area between endpoints 611 and 612 of curve segment 610, in view of the constraints of other bones in the skeleton structure of leg 400.

In the foregoing examples illustrated by FIGS. 4-6, the one-dimensional line segments and/or curve segments that were provided by the Rail Manipulator indicate possible movement in two dimensions (i.e., along the x-axis and the y-axis in the examples of FIGS. 4A-4B and FIGS. 6A-6B, and along the y-axis and the z-axis in the example of FIGS. 5A-5B). However, a computer-generated character may have portions that are movable in more dimensions. When this is the case, the Rail Manipulator may optionally receive additional user input that indicates particular direction(s) of movement that are intended by the user, and display the corresponding range of movement accordingly. That is, if a user-selected portion of a computer-generated character can move in three dimensions, the user may additionally indicate that the intended movements are to be along particular direction(s), such as movements along the x-axis and the y-axis within a z-plane. In response, the Rail Manipulator displays the possible range of movement of the selected portion of the computer-generated character using a simple line segment or a curve segment.

Figure 7:
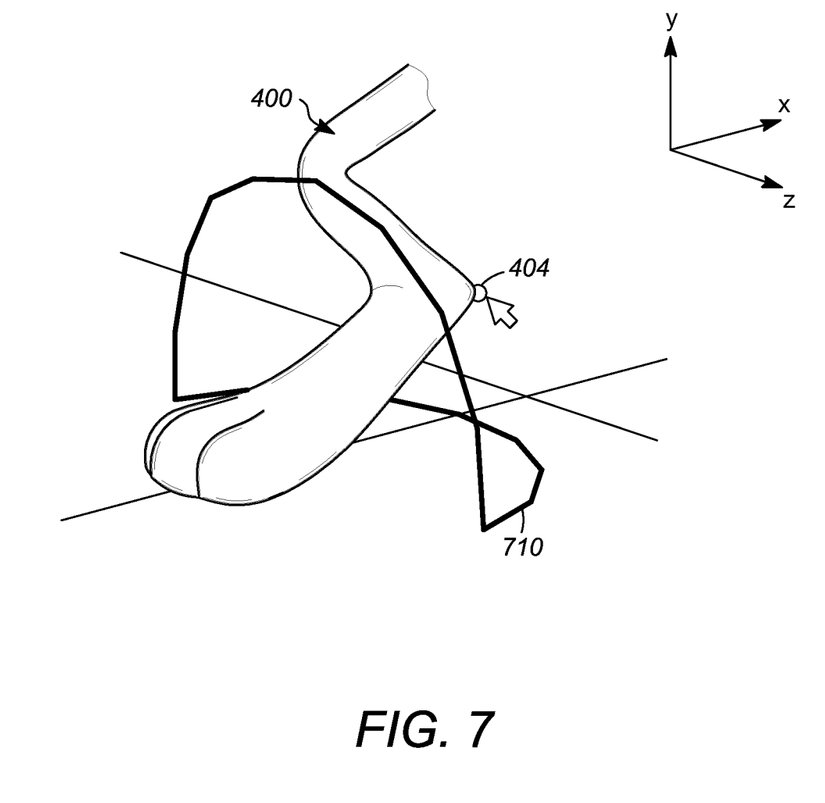
FIG. 7 is a screenshot depicting an exemplary rail manipulator.

In the alternative, if a user does not provide additional input regarding the intended directions of movement, the Rail Manipulator may display an outline of the possible ranges of movement in all dimensions in which movement is possible, which may be referred to as a "swept surface." This aspect of the Rail Manipulator is illustrated in FIG. 7. In FIG. 7, a user has selected node 404, which is associated with the heel portion of leg 400 of tiger 100 (FIG. 1A). The overall skeleton structure of tiger 100 is defined such that the heel portion can rotate freely about the ball of the tiger's foot. Thus, in response to the user selection of node 404, the Rail Manipulator displays swept surface 710 using a combination of line segments and curve segments. Swept surface 710 is two-dimensional and represents the possible range of movement of the heel portion along the x-axis, y-axis, and z-axis. Swept surface 710 resembles one quarter of a sphere, as the movement of the tiger's ball area of the foot would be under the present circumstances. The Rail Manipulator may optionally display a shaded surface of the quarter-sphere (according to swept surface 710) to indicate the potential area of movement of the selected heel.

Figure 8:
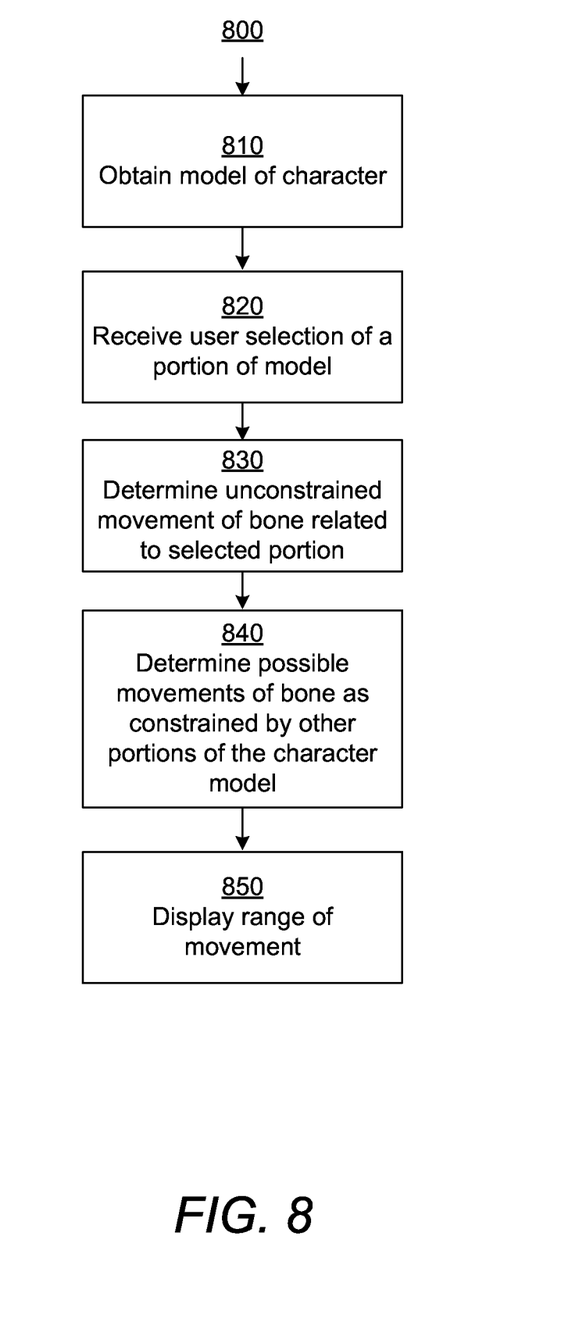
FIG. 8 is a flow diagram depicting an exemplary rail manipulator process used in an embodiment of the rail manipulator.

FIG. 8 depicts an exemplary process 800 for displaying the possible range of movement of a portion of a computer-generated character in a computer animation system. At block 810, process 800 obtains the model (e.g., character rig) of a computer-generated character. At block 820, process 800 receives user input indicating a portion of the character rig that is to be moved. The user input may be a selection of a control point of a bone in the character rig. In some embodiments, the computer animation system provides visual indicators, on the skin of a computer-generated character, that correspond to underlying control points of the character rig. For instance, if a user selects node 404 (FIG. 4) near the heel area of leg 400 (FIG. 4), the Rail Manipulator may interpret the selection as being a selection of a control point of foot bone 201 (FIG. 2).

At block 830, process 800 determines the possible range of movement of the selected control point if the corresponding bone is unconstrained by other portions of the character rig. Generally, the possible range of movement of a given control point is defined by the character rig itself. At block 840, process 800 evaluates the constraints in the character rig to determine what portions of the selected control point's possible range of movement (when left unconstrained) are actually possible in light of the constraints present in the character rig. For instance, if a user selects a control point associated with foot bone 201 (FIG. 2), the Rail Manipulator may identify toe bones 206-208 (FIG. 2), shinbone 202 (FIG. 2), and thighbone 203 (FIG. 2) as constraining the movements of the selected control point. The range of possible movement of foot bone 201 (FIG. 2) would be thus be constrained by the limited ranges of movement of the toe bones and the thighbones.

Process 800 may perform block 840 by directly evaluating the possibility of moving the selected control point from its current position to an adjacent position. For instance, block 840 may evaluate the outcome if the selected control point is moved to the left by a certain value, or if the selected control point is moved to the right by a certain value. A range of possible movement of the selected control point may be determined by evaluating increasing movement values. In this way, block 840 may determine that a selected control point may be moved to the left by X positions, and to the right by Y positions. For compatibility with computer processors of lesser processing power, process 800 may also perform block 840 by approximating the possible movements of a selected control point based on pre-defined definitions in the character rig for the selected control point. The pre-defined definition in the character rig may not take into consideration the constraints that are imposed by the current positions and/or current range of movements of connected bones, and is thus an approximation. At block 850, the Rail Manipulator provides an on-screen display of the determined range of movement for the selected portion of the computer-generated character.

Figure 9:
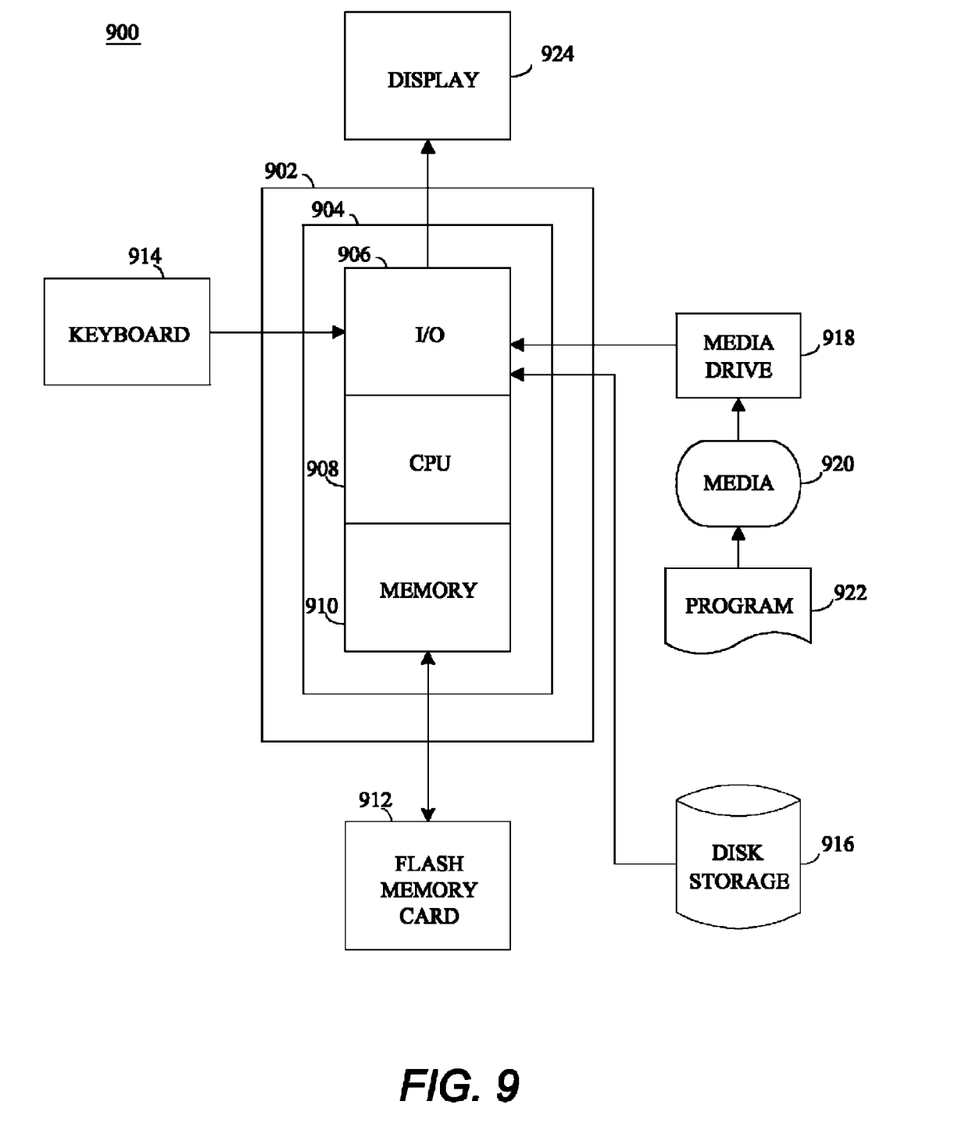
FIG. 9 is a block diagram depicting an exemplary computing system.

FIG. 9 depicts computing system 900 with a number of components that may be used to perform the above-described processes. The main system 902 includes a motherboard 904 having an I/O section 906, one or more central processing units (CPUs) 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, while exemplary embodiments of the Rail Manipulator are described with reference to tiger 100, the Rail Manipulator applies to different computer-generated characters, including animate or inanimate, real or imaginary computer-generated objects. The Rail Manipulator may also be used with computer-generated objects that are anatomically correct or anatomically incorrect. Aspects of embodiments disclosed above can be combined in other combinations to form additional embodiments. All such modifications are intended to be included within the scope of this technology.

What is claimed is:

1. A computer-enabled method for indicating ranges of possible movement of a computer-generated character in a computer animation system, the method comprising:
    obtaining a model of the computer-generated character, wherein the model includes a skeleton having a plurality of bones connected at one or more joints;
    receiving a user's selection of a first portion of the model, wherein the first portion is in an initial position, wherein the selected first portion corresponds to at least a part of a first bone of the plurality of bones, wherein the first bone is in an initial position;
    identifying a second bone connected to the first bone;
    determining the ranges of possible movement of the selected first portion based on the initial position of the first bone and a position of the second bone,
        wherein the ranges of possible movement represent the limits of possible movement in three dimensions in which the selected first portion is freely movable from its initial position based on one or more constraints of the model, and
        wherein the ranges of possible movement of the selected first portion is limited by the position of the second bone; and
    displaying, on a display screen, a graphical outline of the ranges of possible movement, of the selected first portion, in the three dimensions,
        wherein the displayed graphical outline indicates the positions that the selected first portion can be freely moved to from its initial position based on the determined ranges of possible movement.

2. The method according to claim 1, the method further comprising:
    determining a range of possible movement of the second bone; and
    determining the ranges of possible movement of the selected first portion based on the range of possible movement of the second bone, wherein the ranges of possible movement of the selected first portion is also limited by the range of possible movement of the second bone.

3. The method according to claim 2,
    wherein the displaying of the ranges of possible movement of the selected first portion comprises displaying a plurality of line segments and/or curve segments,
    wherein the plurality of line segments and/or curve segments intersect to bound an area, and
    wherein the bounded area represents the possible positions of the selected first portion.

4. The method according to claim 3, wherein the received user input represents movement of the selected first portion to a new position, the method further comprising:
    displaying an indicator on the bounded area, wherein the indicator represents the new position of the selected first portion relative to the displayed ranges of possible movement of the selected first portion.

5. The method according to claim 1, wherein:
the displaying of the ranges of possible movement of the selected first portion comprises displaying a shaded surface representing the ranges of possible movement.

6. The method according to claim 1, the method further comprising:
receiving additional user input, wherein the additional user input represents movement of the selected first portion away from the initial position, the additional user input has a first movement component that is within the determined ranges of possible movement of the first portion, the additional user input has a second movement component that is outside the determined ranges of possible movement of the first portion;
limiting movements of the selected first portion to correspond to the determined ranges of possible movement of the first portion; and
displaying movements of the selected first portion in response to at least a portion of the received user input.

7. A non-transitory computer-readable storage medium having computer-executable instructions for indicating ranges of possible movement of a computer-generated character, wherein the computer-executable instructions, when executed by one or more computer processors, causes the one or more computer processors to:
obtain a model of the computer-generated character, wherein the model includes a skeleton having a plurality of bones connected at one or more joints;
receive a user's selection of a first portion of the model, wherein the first portion is in an initial position, wherein the selected first portion corresponds to at least a part of a first bone of the plurality of bones, wherein the first bone is in an initial position;
identify a second bone connected to the first bone;
determine the ranges of possible movement of the selected first portion based on the initial position of the first bone and a position of the second bone,
wherein the ranges of possible movement represent the limits of possible movement in three dimensions in which the selected first portion is freely movable from its initial position based on one or more constraints of the model, and
wherein the ranges of possible movement of the selected first portion is limited by the position of the second bone; and
cause a display of a graphical outline of the ranges of possible movement, of the selected first portion, in the three dimensions,
wherein the displayed graphical outline indicates the positions that the selected first portion can be freely moved to from its initial position based on the determined ranges of possible movement.

8. The computer-readable storage medium according to claim 7, further comprising computer-executable instructions for:
determining a range of possible movement of the second bone; and
determining the ranges of possible movement of the selected first portion based on the range of possible movement of the second bone, wherein the ranges of possible movement of the selected first portion is also limited by the range of possible movement of the second bone.

9. The computer-readable storage medium according to claim 8,
wherein the displaying of the ranges of possible movement of the selected first portion comprises displaying a plurality of line segments and/or curve segments,
wherein the plurality of line segments and/or curve segments intersect to bound an area, and
wherein the bounded area represents the possible positions of the selected first portion.

10. The computer-readable storage medium according to claim 9, wherein the received user input represents movement of the selected first portion to a new position, the computer-readable storage medium further comprising computer-executable instructions for:
displaying an indicator on the bounded area, wherein the indicator represents the new position of the selected first portion relative to the displayed ranges of possible movement of the selected first portion.

11. The computer-readable storage medium according to claim 7, wherein:
the displaying of the ranges of possible movement of the selected first portion comprises displaying a shaded surface representing the ranges of possible movement.

12. The computer-readable storage medium according to claim 7, further comprising computer-executable instructions for:
receiving additional user input, wherein the additional user input represents movement of the selected first portion away from the initial position, the additional user input has a first movement component that is within the determined ranges of possible movement of the first portion, the additional user input has a second movement component that is outside the determined ranges of possible movement of the first portion;
limiting movements of the selected first portion to correspond to the determined ranges of possible movement of the first portion; and
displaying movements of the selected first portion in response to at least a portion of the received user input.

13. A computer graphics system for animating a computer-generated character, the system comprising a server operatively coupled to a display screen and to a user input device, wherein the server is configured to:
obtain a model of the computer-generated character, wherein the model includes a skeleton having a plurality of bones connected at one or more joints;
receive a user's selection of a first portion of the model, wherein the first portion is in an initial position, wherein the selected first portion corresponds to at least a part of a first bone of the plurality of bones, wherein the first bone is in an initial position;
identify a second bone connected to the first bone;
determine the ranges of possible movement of the selected first portion based on the initial position of the first bone and a position of the second bone,
wherein the ranges of possible movement represent the limits of possible movement in three dimensions in which the selected first portion is freely movable from its initial position based on one or more constraints of the model, and
wherein the ranges of possible movement of the selected first portion is limited by the position of the second bone; and
cause a display, on the display screen, of a graphical outline of the ranges of possible movement, of the selected first portion, in the three dimensions,
wherein the displayed graphical outline indicates the positions that the selected first portion can be freely moved to from its initial position based on the determined ranges of possible movement.

14. The system according to claim 13, wherein the server is further configured to:
   determine a range of possible movement of the second bone; and
   determine the ranges of possible movement of the selected first portion based on the range of possible movement of the second bone, wherein the ranges of possible movement of the selected first portion is also limited by the range of possible movement of the second bone.

15. The system according to claim 14,
   wherein the displaying of the ranges of possible movement of the selected first portion comprises displaying a plurality of line segments and/or curve segments,
   wherein the plurality of line segments and/or curve segments intersect to bound an area, and
   wherein the bounded area represents the possible positions of the selected first portion.

16. The system according to claim 15, wherein the server is further configured to:
   display an indicator on the bounded area, wherein the indicator represents the new position of the selected first portion relative to the displayed ranges of possible movement of the selected first portion.

17. The system according to claim 14, wherein:
   the display of the ranges of possible movement of the selected first portion comprises a display of a shaded surface representing the ranges of possible movement.

18. The system according to claim 13, wherein the server is further configured to:
   receive additional user input, wherein the additional user input represents movement of the selected first portion away from the initial position, the additional user input has a first movement component that is within the determined ranges of possible movement of the first portion, the additional user input has a second movement component that is outside the determined ranges of possible movement of the first portion;
   limit movements of the selected first portion to correspond to the determined ranges of possible movement of the first portion; and
   display movements of the selected first portion in response to at least a portion of the received user input.

* * * * *